United States Patent [19]

Kammerl et al.

[11] 3,909,511

[45] Sept. 30, 1975

[54] ARRANGEMENT FOR THE IDENTIFICATION OF REQUESTS IN PROGRAM-CONTROLLED DATA SWITCHING SYSTEMS

[75] Inventors: Anton Kammerl, Grobenzell; Bernhard Schaffer, Munich, both of Germany

[73] Assignee: Siemens Aktiengesellschaft, Munich, Germany

[22] Filed: Sept. 23, 1974

[21] Appl. No.: 508,620

[30] Foreign Application Priority Data

Sept. 25, 1973 Germany............................ 2348255

[52] U.S. Cl. .............................. 178/3; 340/147 MD

[51] Int. Cl.$^{2}$ ...................... H04L 11/00; H04Q 3/64

[58] Field of Search ........ 178/3, 2 R, 2 C, 2 D, 2 E, 178/17.5; 340/147 R, 147 MD, 147 G, 147 P, 147 T, 163, 150

[56] References Cited

UNITED STATES PATENTS

| | | | |
|---|---|---|---|
| 3,300,759 | 1/1967 | Chapman et al. | 340/147 MD |
| 3,529,293 | 9/1970 | Sullivan et al. | 178/3 |
| 3,531,772 | 9/1970 | Dalyai et al. | 178/3 |
| 3,571,798 | 3/1971 | Dawson et al. | 178/3 |
| 3,717,723 | 2/1973 | Jaskulke et al. | 178/3 |

*Primary Examiner*—Thomas A. Robinson

*Attorney, Agent, or Firm*—Schuyler, Birch, Swindler, McKie & Beckett

[57] ABSTRACT

A program controlled data switching system wherein the connection circuits include storage devices and gate switching elements; the transfer of items of information occurring on the lines into the storage devices is controlled in groups by means of a central interrogation pulse train. Initially gate switching elements emit a request criterion; to identify the connection circuits transmitting a request criterion, for each position or digit of the code used to characterize the connection circuits there is provided a series of decentralized identification devices which are arranged in stages in accordance with the known coordinate principle, and are connected to one another via request and resetting lines; means are provided to code and store the identification result.

10 Claims, 8 Drawing Figures

ARRANGEMENT FOR THE IDENTIFICATION OF REQUESTS IN PROGRAM-CONTROLLED DATA SWITCHING SYSTEMS

BACKGROUND OF THE INVENTION

The invention relates to an arrangement for the prompt identification of lines connected to connection circuits of a line termination unit of a program-controlled data switching system, and for coding the identification result, wherein each connection circuit is assigned a specific number.

The principle of a recently disclosed program controlled data switching system consists in that each of the lines connected to a line termination unit is assigned its own cell in a central store. This storage cell, referred to in the following as a "feeder cell" contains all the information required for the execution of switching-oriented functions. The traffic between the line termination unit and the central store takes place cyclically. As an address for the operation of the feeder cells in the central store one uses the number of a connection circuit to which the relevant line is connected. Thus it is necessary to find each line which is presenting an item of information, to determine the number of the connection circuit assigned to this line and to recode the number which has been found in this way a form suitable for the operation of the central store. Each action of the switching system which is initiated by the occurrence of an item of information on a line is thus conditional upon an identification and a coding process. These activities must also be carried out in the reverse direction, i.e., in the direction from the central storage unit to the line termination unit and from there to an outgoing line. In this case, on the basis of an item of address information read out from the central store, namely from the feeder cell, it is necessary to decode the read out address and to make a selection on the basis of the number thereby provided.

These hunting and identification processes which are initiated both on reception and on the transmission of an item of information take place in the line termination unit. This contains the connection circuits which are in each case permanently assigned to the connected lines and socalled input and output code converters. A process and an arrangement for the selection and interrogation of terminals in data switching systems with central, programmable control, is described in the German OS 1 946 389. In accordance with this disclosure an identification and hunting device operating by the so-called hunting chain principle serves to seek out and to identify a plurality of lines making requests.

Arrangements in accordance with this prior art operate relatively slowly however. This is particularly unfavorable when a high speed store is employed as central store, whose cycle times are in the order of 200 ns. As the chain hunting principle operates in the manner of a series hunting process, the number of hunting steps is determined by the number of possible requests which with unfavorable distribution may comprise a full cycle of the hunting chain. The waiting times which result can then lead to disproportionately high and non-acceptable distortions in the request processing.

Consequently it is necessary to improve the hunting and identification processes in order to increase the efficiency of a line termination unit. At the same time, however, it is also necessary to take into account the high requirements which are made firstly on the reliability and on the other hand on the extendability of such systems.

In order to ensure a reliable operation it is known to carry out a division into breakdown units, it being necessary to be able to monitor these breakdown units in a simple manner without any particular outlay, i.e., without expensive test programs. With respect to the extendability, the requirement is imposed that the overall system should be able to be further developed by simply adding further breakdown units.

SUMMARY OF THE INVENTION

The aim of the invention accordingly consists in providing an arrangement which ensures the identification of requests and the coding of the identification result at intervals of the cycle duration of the central store, without giving preference to individual lines making requests. This last point means that it is necessary to work through requests, i.e., to identify requesting lines in the sequence of the times at which the requests arrive. The waiting times are thus kept so short that disturbing distortions are avoided.

Further aims of the invention consist in enabling a division into as small as possible breakdown units so that the breakdown of such a unit does not substantially affect the operation of the overall system. Arrangements which fulfill these requirements are also to be capable of being extended in the shortest possible stages, such extensions also to be possible during operation without imposing great restrictions on the operation.

For the realization of these aims, the invention is based on carrying out identification in accordance with the so-called coordinate principle. This means that one coordinate stage is provided for one position or digit of the code which is used for the numbers. The construction and mode of operation of a hunting and identification arrangement operating by the coordinate principle are described for example in the German Pat. Nos. 1 264 525 and 1 287 600.

In the embodiment in accordance with the invention, the connection circuits include storage devices and gate switching elements; the transfer of items of information occurring on the lines into the storage devices can be controlled in groups by means of a central interrogation pulse train. Gate switching elements emit a request criterion; in each case following the processing of an intermediately stored group of requests, with the aid of the central interrogation pulse train the items of information which have occurred meanwhile on the lines are transferred as a new request group. To identify the connection circuits transmitting a request criterion, for each position or digit of the code used to characterize the connection circuits there is provided a series of decentralized identification devices which are arranged in stages in accordance with the known coordinate principle, and are connected to one another via request and resetting lines; to provide the coding and the intermediate storage of the identification result, coding switching elements and registers are provided for each stage.

This arrangement enables a substantial approximation of the socalled "first in-first out" principle. This means that the processing sequence is coordinated with the times of arrival of requests considerably better than in known arrangements, the correct processing times in each case relating to a group of requests. As each intermediately stored group of requests is processed, with the aid of the central interrogation pulse train the items of information which have meanwhile occurred on the lines are transferred as new requests. Thus the groups do not contain constant numbers of requests, but as a rule consecutive groups will probably contain a variable number of requests.

Within the scope of the invention, the items of information which have been transferred in groups and have been intermediately stored as request criteria can be identified and coded in such manner that the identification result of a coordinate stage is coded in a coder assigned to this stage, and is stored in a register which is common to the entire stage. Only when all the stages have been passed through is the entire identification result transferred to the central store, the request being simultaneously reset. Thus this invention operates with continuous coding. However, it is also possible to code the identification result of a stage in a coder assigned to each identification device and to intermediately store it in a register assigned to each identification device. In this case the contents of an intermediate-storing register is passed on from stage to stage, so that when a stage is processed at the same time resetting occurs and a new identification process is stored in the preceding stage. Thus a stage-by-stage coding takes place.

Whereas the first described embodiment provides advantages in terms of outlay in comparison to the second embodiment, the second embodiment is particularly suitable for cooperation with a central store whose cycle time is very short, for example approximately 200 na. In this case a request need only pass through one stage with only one identification device. As in this case the identification result is intermediately stored in the stage themselves, the sequence in which the requests are identified can be made as rapid as permitted by the coding, identification and resetting processes in one single stage.

BRIEF DESCRIPTION OF THE DRAWINGS

Further explanation and details of the invention will be given in the following making reference to the drawings, in which.

DESCRIPTION OF PREFERRED EMBODIMENT

Arrangement with Continuous Coding

Figure 1:
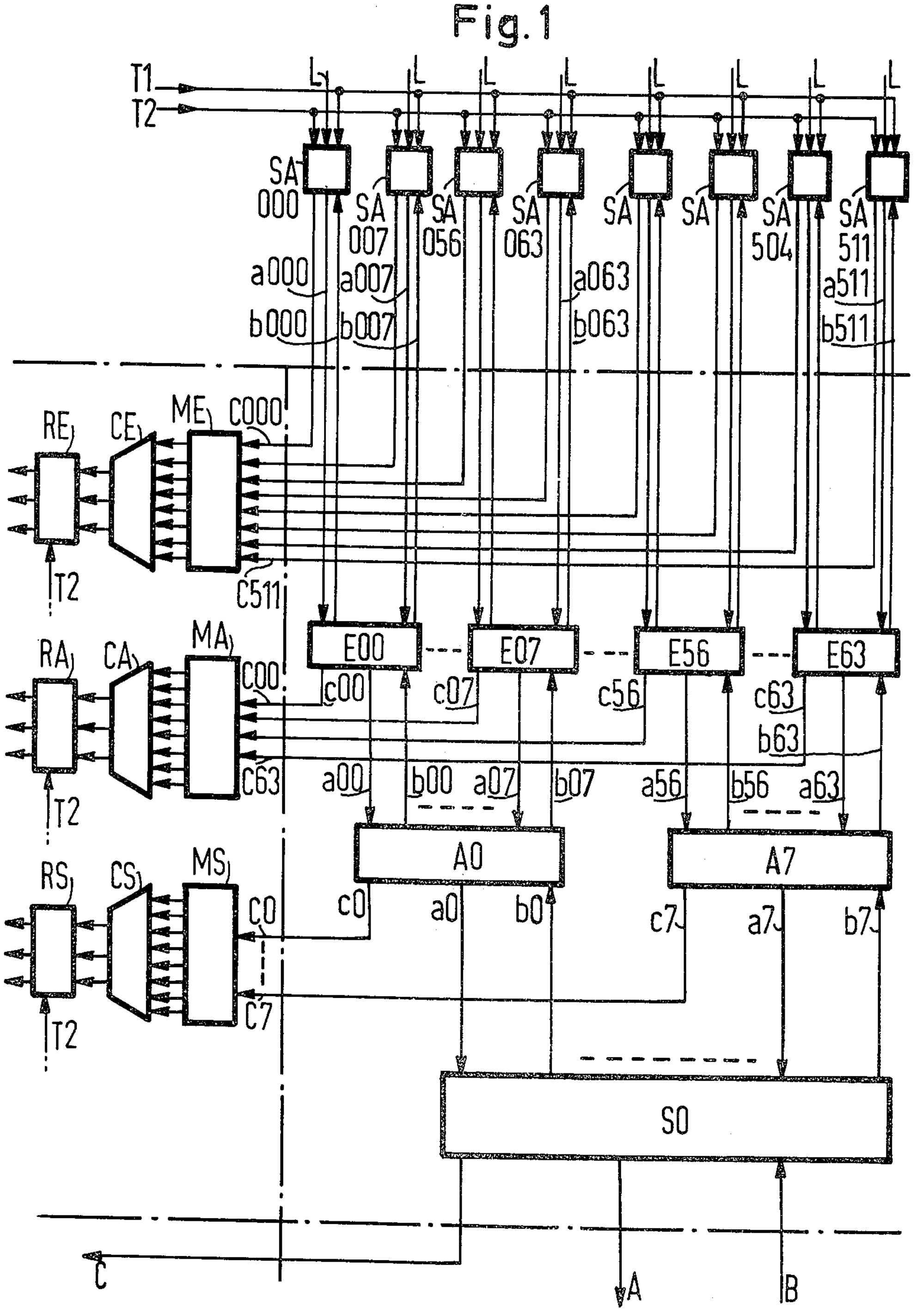
FIG. 1 shows an arrangement which operates according to the principle of continuous coding.

In explanation of an exemplary embodiment with continuous coding reference is made to FIG. 1. The arrangement illustrated therein is designed for 512 terminals or lines which are referenced L. Each line L is assigned a connection circuit SA000 to SA511. The storage devices which serve to receive items of information occurring on the lines are provided in the connection circuits. However, it is also possible to provide a special register for this purpose.

The identification takes place with the aid of the identification devices which are arranged in stages in accordance with the known coordinate principle. As known, this is understood in that for one position or digit of the code selected to characterize a number, there is in each case provided a stage with a series of identification devices. The present example is based on a three position octal code. This means that for $8^3 = 512$ connection circuits in the first stage, in each case $8^2 = 64$ identification devices are provided in the second stage, namely the identification devices E00 to E63; eight connection circuits of the first stage are connected to one identification device in the second stage. In each case eight identification devices in the second stage are each assigned one identification device A0 to A7 in the third stage. In each case eight identification devices in the third stage are in turn assigned an identification device S0 in the fourth stage.

Thus in FIG. 1, for the identification of 512 lines, in addition to the 512 connection circuits SA000 to SA511 in the first stage there are required 64 identification devices E00 to E63 in the second stage, eight identification devices A0 to A7 in the third stage and one identification device S0 in the fourth stage. The identification devices in the second, third and fourth stages consequently, in the direction towards the particular preceding stage, possess 8 terminals via which, for the reception of request criteria and for the transmission of resetting criteria, they are connected to the identification devices of the particular preceding or lower value stage. Each identification device has one input and output in the direction of the following or the next higher stage. Furthermore each identification device is connected via an identification line to a coder provided in each stage. If necessary the coders are in each case preceded by mixer circuits. The coding results are stored in registers.

For the coding and storage of the identification result of the first stage (units digits of the selected code) the mixer circuit ME, the coder CE and the register RE are provided. The coding and the storage of the identification result of the second stage (tens digit of the code) is carried out via the mixer circuit MA, the coder CA and the register RA. In the third stage these functions are assumed by the mixer circuit MS, the coder CS and the register RS.

The transfer by groups of items of information occurring on the lines L is carried out with the pulse train T1 which will be referred to as an interrogation pulse train in the following. Together with the interrogation pulse train T1, in the connection circuits the items of information are stored and at the same time the request criteria are formed. The erasure of a request when identification has taken place is carried out, as explained later, with a pulse train T2 which will be referred to in the following as a transfer pulse train.

Figure 2:
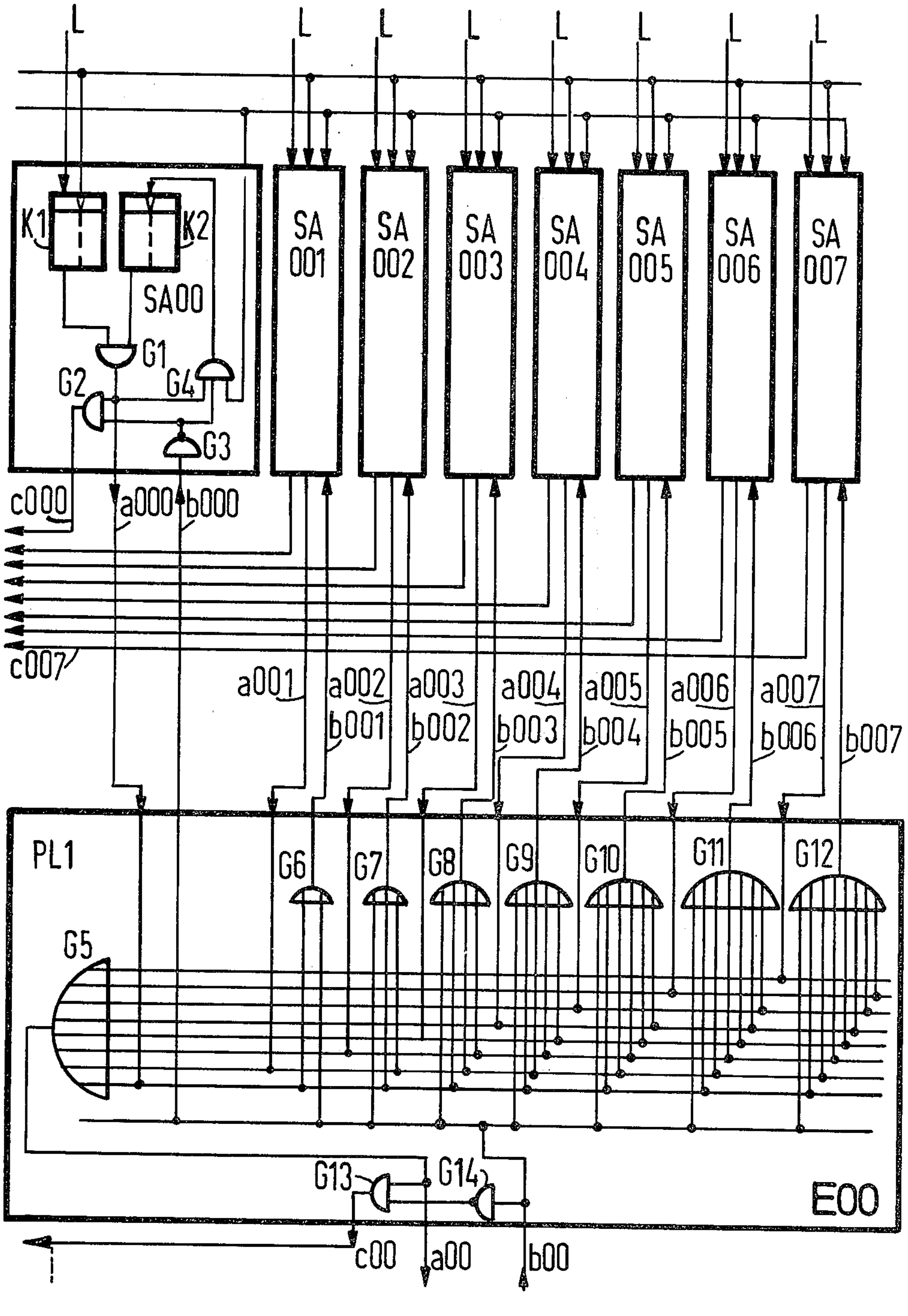
FIG. 2 shows the construction of a connection circuit and an identification device which are used in an arrangement as shown in FIG. 1.

FIG. 2 shows the construction of a connection circuit which is suitable for the storage of requests and the construction of an identification device. Of the eight connection circuits SA000 to SA007 here only the connection circuit SA000 and the identification device E00 are shown in detail. As storage devices, each connection circuit contains two bistable trigger stages K1 and K2. The first stage K1 is, on the occurrence of an item of information in the form of a polarity change on the line L prepared appropriately to be reversed with the next interrogation pulse train T1. The outputs of the two trigger stages K1 and K2 are connected to the inputs of an EXCLUSIVE-OR gate G1. A criterion is emitted at the output of this gate whenever the two trigger stages K1 and K2 have different states. As the trigger stage K2 is always in the position which corresponds to the stage on the line L before a polarity change, a request criterion in the form of a 1 occurs at the output of the gate G1 whenever an item of information in the form of a polarity change has actually occurred on the line L, and has been intermediately stored with the interrogation pulse train T1. Simultaneously with the request criterion, and AND gates G2 and G4 are prepared. The identification line *c*000 is connected to the output of gate G2 over which the identification result passes via the units position of the relevant connection circuit to the mixer circuit ME. This information is coded in the coder CE and stored as a 3-bit code in the register RE. The gate G4 serves to control the second trigger stage K2 which, when identification has taken place, with the transfer pulse train T2 is brought into the position corresponding to the new polarity change on the line L; at the same time the request criterion at the output of the gate G1 is disconnected.

The eight connection circuits SA000 to SA007 of the first stage are connected to the identification device E00 in the second stage. The latter contains the priority logic circuit PL1 with the gates G5 to G12. Via the OR gate G5 each request criterion which occurs on one of the request lines a000 to *a*007 is passed via a request line *a*00 to an identification device which has not been shown here in the following stage. The OR gates G6 to G12 are connected to the request lines *a*000 to *a*007 in such manner that a resetting criterion always passes only via one of the resetting lines *b*000 to *b*007 to one of the connection circuits SA000 to SA007. The sequence for identification in the present example is such that the request criterion which arrives via the request line a000 possesses the highest priority. Via the gates G13 and G14 in the identification device E00, an identification criterion is available which passes via the identification line *c*00 to the mixer circuit MA illustrated in FIG. 1, is coded in the coder CA and is transferred as 3-bit code into the register RA. Also via the resetting line *b*00 the identification device E00 receives a resetting criterion from an identification device, not shown here, in the following stage. It should be mentioned at this point that all the identification devices and all the connection circuits are constructed based on the teachings of FIG. 2.

Figure 3:
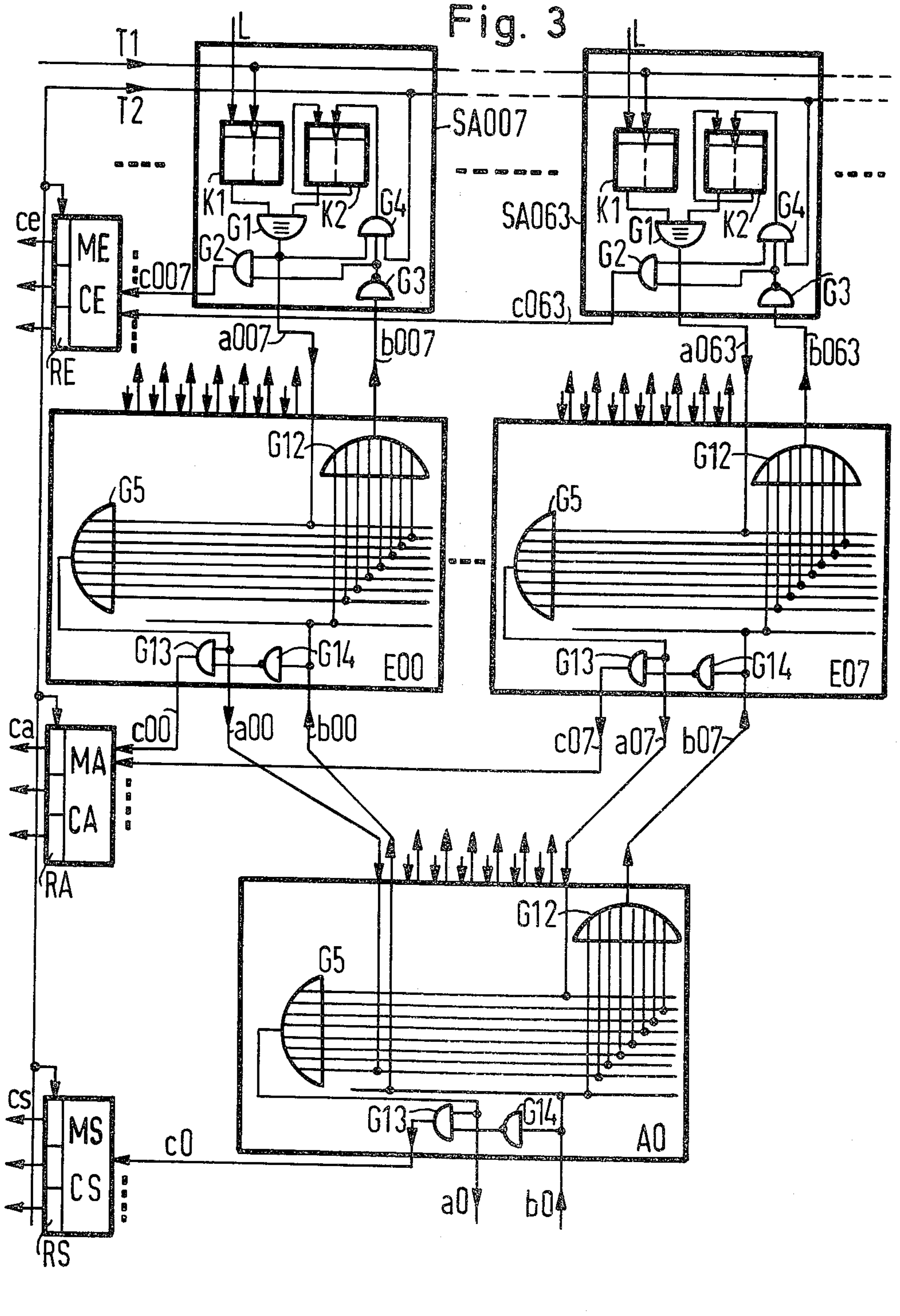
FIG. 3 illustrates the identification and coding process of continuous coding of the FIG. 1 embodiment.

The sequence of an identification and coding process will be described in the following making reference to FIG. 3. It will be assumed that on the occurrence of the interrogation pulse train T1 on the lines which are assigned the connection circuits SA007 and SA063, a polarity change has occurred. A request criterion is produced in the form of a 1 in the described manner via the gate G1 in the connection circuits SA007 and SA063. Commencing from the connection circuit SA007, this request criterion passes via the request line *a*007 to the identification device E00 in the second stage, from there via the gate G5 and the request line *a*00 to the identification device A0 in the third stage. Also the request criterion in the connection circuit SA063 passes as 1 to the identification device A0 in the third stage. This path leads via the request line *a*063 to the identification device E07 in the second stage and from there via the request line *a*07 to the identification device A0 in the third stage. Via the request line *a*0 in the third stage and via the identification device not shown in FIG. 3 in the fourth stage a message criterion (A in FIG. 1) is emitted which is evaluated in a manner which has not been represented, evaluation techniques being well known in the art and not a portion of this invention. If the entire request for an identification and coding process is ready, the ready criterion (B in FIG. 1) will be available at the resetting input of the identification device in the highest stage. Via the identification device in the fourth stage and via the line *b*0 this criterion passes in the form of a 0 to the resetting input of the identification device A0.

In the present example this criterion passes as a 0 merely to the connection circuit SA007. This path leads across the identification device A0 and the resetting line *b*00 to the identification device E00 and from there via the gate G12 and the resetting line *b*007 to the connection circuit AS007.

On this path, the gates G3 in the connection circuit SA007, G13 in the identification device E00 and G13 in the identification device A0 which have been prepared by the request criterion of the connection circuit SA007 are enabled. Via the identification lines *c*007 in the first stage, *c*00 in the second stage and *c*0 in the third stage, the relevant inputs of the mixer circuits ME, MA and MS are energized. The coders CE, CA and CS in known manner, form the identification result *ce*, *ca* and *cs* in each case in the form of a 3-bit code for the first position (units position), for the second position (tens position) and for the third position (hundreds position) of the particular connection circuit which has transmitted the request criterion.

By means of the resetting criterion in the connection circuit SA007 the gate G4 has been prepared in such manner that the next pulse of the transfer pulse train T2 reverses the trigger stage K2. Its position now corresponds to the state which has been stored in the trigger stage K1 and which corresponds to the potential state currently prevailing on the line L. The request criterion at the output of the gate G1 is thus disconnected. The transfer pulse train T2 is advantageously connected simultaneously to transfer the items of information ce, ca and cs stored in the individual code registers CE, CA and CS.

On the disconnection of the request criterion of the connection circuit SA007 the criterion on the resetting line *b*0 now passes to the connection circuit SA063 (G12 in A0, *b*07, G12 in E07, *b*063, SA063). In the described way the gates which have been prepared by the request criterion transmitted from the connection circuit SA063 are enabled. In the connection circuit SA063 this is the gate G2, and in the identification devices E07 and A0 this is in each case the gate G13. In the described way, via the identification lines *c*063, *c*07 and *c*0 the corresponding inputs of the mixer circuits ME, MA and MS are energized. Via the coders CE, CA and CS the identification result *ce*, *ca* and *cs* for each position or digit of the code are transmitted in the form of a 3-bit code into the registers RE, RA and RS. By means of the transfer pulse train T2 on the one hand these registers are read out and on the other hand the trigger stage K2 in the connection circuit SA063 is reversed. Thus the request criterion emitted from this connection circuit is disconnected.

If no other requests are present, the criterion applied to output of the identification device A0 via the line a0 is also thus disconnected. Thus via the following identification device the message criterion (A in FIG. 1) is also disconnected. The next interrogation pulse train T1 will now cause all the polarity changes which have newly arisen in the meantime on the lines L to be transferred, identified and coded in thhe described manner.

Arrangement With Stage-By-Stage Coding

Figure 4:
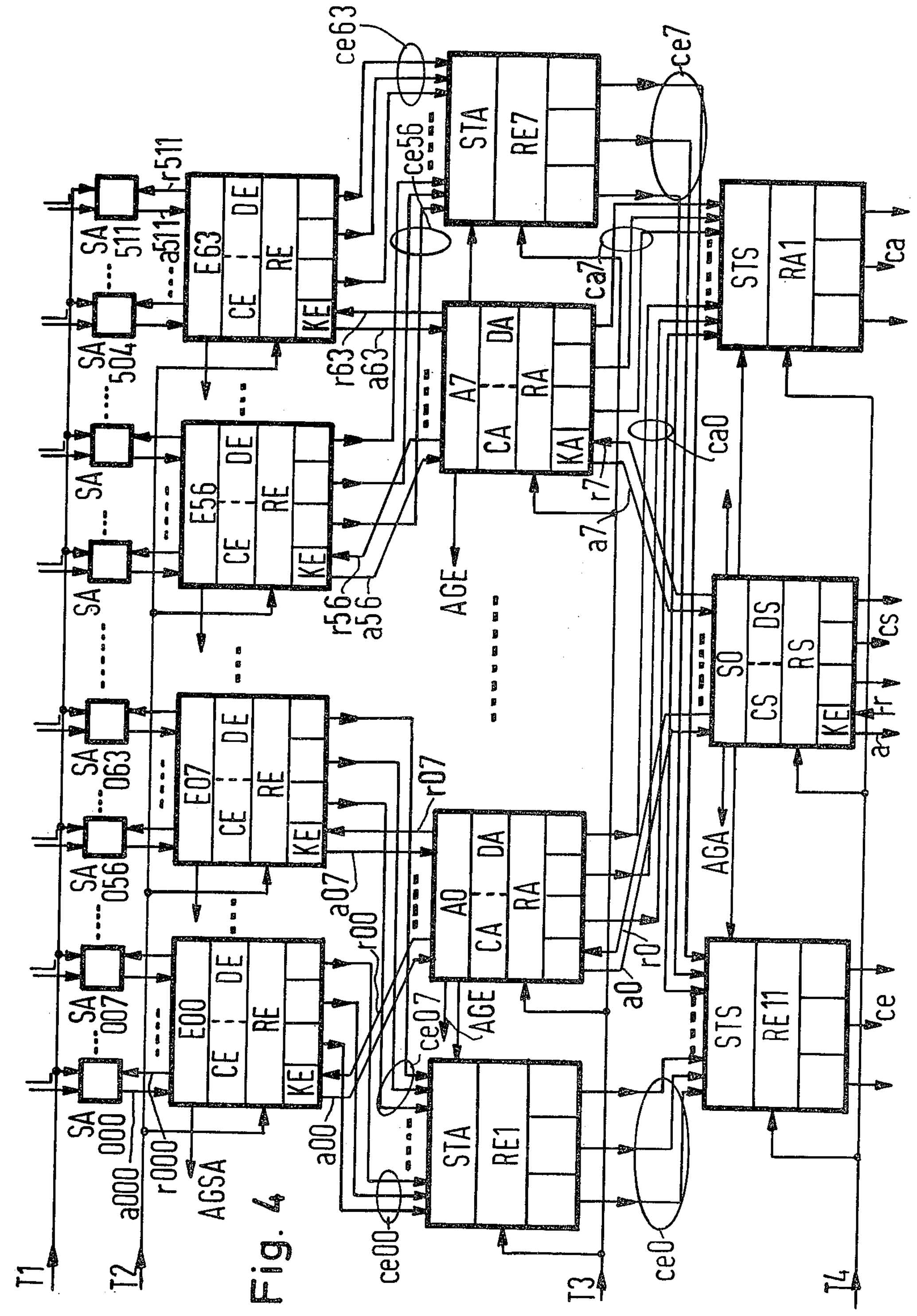
FIG. 4 shows an arrangement which operates by the principle of stage-by-stage coding.

An exemplary embodiment which operates with stage-by-stage coding is shown in FIG. 4. Here the intermediate storage of an identification result in coded form always takes place directly in the identification devices of the individual stages. As in this case a request criterion in each case is only required to pass through one stage and the identification result is intermediately stored in the next higher stage, the request in the particular preceding stage can be reset immediately thereafter. This means that the sequence of handling of requests produced by polarity changes on the lines can be as rapid as permitted by the identification, the coding and the resetting process in a single stage.

In the exemplary embodiment shown in FIG. 4 it has again been assumed that 512 connection circuits SA000 to SA511 are provided and that a three-position octal code is employed for coding. The identification of connection circuits which emit request criteria is again carried out through a multi-stage arrangement of identification devices. The first stage again contains the connection circuits SA000 to SA511 to which the lines L are connected. Via the request lines *a*000 to *a*511 and via the resetting lines *b*000 to *b*511 the latter are connected in groups of eight to the identification devices E00 to E63 in the second stage. Each identification device is assigned a coder CE, a decoder DE and an intermediate storing register RE. The information corresponding to the so-called units position of an identified connection circuit is intermediately stored in these registers. In a further position KE of these registers a criterion is entered whenever the relevant identification device E00 to E63 is participating in an identification process of the first stage.

Via the request lines *a*00 to *a*63 and via the resetting lines *b*00 to *b*63, the identification devices E00 to E63 in the second stage are connected to the identification devices A0 to A7 in the third stage. These are again in each case assigned a coder CA, a decoder DA and a register RA to accomodate an item of information which has been identified in the second stage and corresponds to the so-called tens position of the connection circuit. In another position KA of these registers it is again in each case noted whether an identification device in the third stage was participating in an identification process in the preceding stage. Finally the identification devices A0 to A7 in the third stage are connected via request lines *a*0 to *a*7 and the resetting lines *b*0 to *b*7 to the identification device S0 of the fourth and last stage. The latter is also assigned a coder CS, a decoder DS and a register RS to accomodate the information corresponding to a hundreds position of an identified connection circuit.

As in the stage-by-stage identification, the particular preceding stage is in each case reset on the transfer of the request criterion; additional stores are provided which receive the identification result of the particular preceding stage. In FIG. 4 these stores are realised as 3-bit registers. For the transfer of the identification result intermediately stored in the registers RE of the second stage, the third stage contains the registers RE1 to RE7 which are connected via the identification lines *ce*00 to *ce*63 to the registers RE. A select criterion for the transfer of a 3-bit combination is emitted from the identification devices of the relevant stage; thus, in the example from the identification devices A0 to A7. The identification result contained in the stores RE1 to RE7 is, with the progression of the identification process, transferred via the identification lines *ce*0 to *ce*7 to the store RE11 in the fourth stage. The identification results contained in the registers RA of the third stage here are received by the store RA1 which is connected to the registers RA via the identification lines *ca*0 to *ca*7. Thus at the output of the fourth stage there is available the information *ce* for the units position, the information *ca* for the tens position and the information cs for the hundreds position of the selected connection circuit.

The sequence of an identification — and coding process is carried out in pulse-train-controlled fashion with the aid of the interrogation pulse train T1 and the transfer pulse train T2 to T4. The switch-through of the pulse train T1 to T4 is dependent upon the handling of a request in the particular following stage. The interrogation pulse train T1 passes to the connection circuits only when the identification devices E00 to E63 in the second stage are free, which takes place e.g., through the evaluation of the signals AGSA. The transfer pulse train T2 with which the transfer of requests from the first stage into the second stage is controlled is connected only when the identification devices A0 to A7 in the third stage are free. This is determined by evaluating the signals AGE. The transfer pulse train T3 with which the transfer of a request criterion from the second into the third stage is controlled, is connected only when the identification device in the fourth stage is free which is recognized by the valuation of the signals AGA. Finally the information contained in the third stage is transferred into the fourth stage with the aid of the transfer pulse train T4 only when a following stage or a following central control unit has handled the items of information which were transferred during a previous identification process. The signals AGSA, AGE and AGA are formed by the monitoring of the identification devices of a stage.

The construction of a connection circuit and of an identification device for this embodiment will be described making reference to FIG. 5. Each connection circuit — in the example only the connection circuit SA000 has been shown in detail — again contains the two trigger stages K1 and K2 which via an EXCLUSIVE-OR gate form the output for the request criterion. The trigger stage K1 is prepared by a polarity change occurring on the line L, and is reversed on the arrival of the interrogation pulse train T1. At the output of the gate G1 a 1 thereupon appears which passes via the request line *a*000 to the first input of the identification device E00. The pulse train input of the trigger stage K2 is connected to the resetting line *b*000. The resetting criterion is emitted from the first resetting output of the identification device E00.

Figure 5:
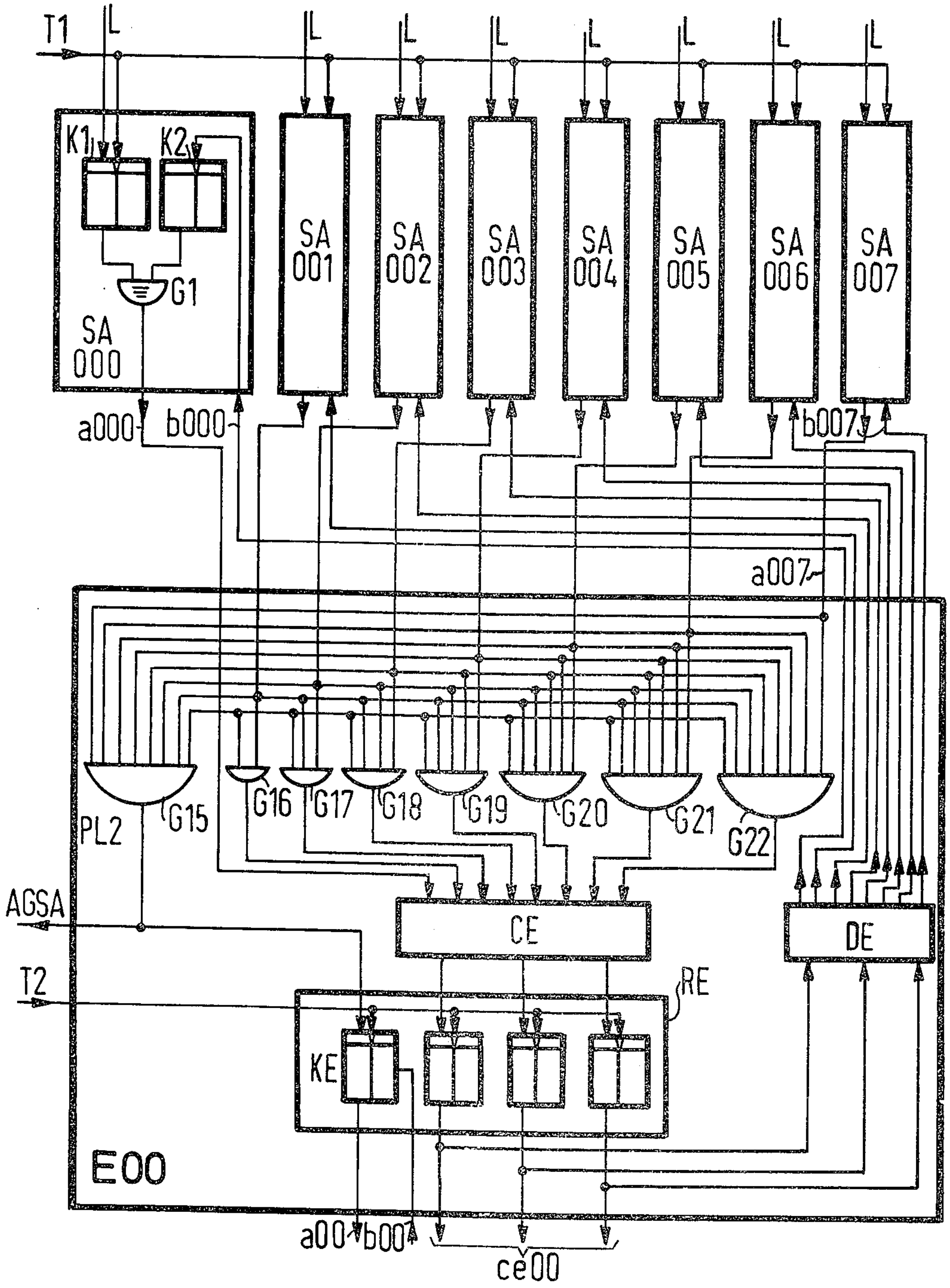
FIG. 5 shows the construction of a connection circuit and an identification circuit which are employed in an arrangement as shown in FIG. 4.

The identification device E00 represented in FIG. 5 contains the priority logic circuit PL2 which is composed of the gates G15 to G22 and which ensures that in each case only one of the eight possible request criteria is evaluated; in the present exemplary embodiment, a request criterion on the line *a*000 has the highest priority. In the coder CE which follows the priority logic circuit PL2, the number of the selected connection circuit is converted into an item of 3-bit information. This information is offered to the intermediate-storing register RE. The transfer only takes place however with the transfer pulse train T2. Each request arriving in the identification device E00 leads, via the gate G15, both to the formation of the signal AGSA, with which the interrogation pulse train T1 is blocked and also the preparation of the register position KE. On the arrival of the transfer pulse train T2, the register position KE is set with a 1 and also the register positions RE are set in accordance with the information formed in the coder CE. Via the decoder DE the information is decoded. The resetting criterion is transferred via one of the resetting lines to the selected connection circuit. In the example shown in FIG. 5 the resetting criterion is omitted via the resetting line *b*000 to the connection circuit SA000. There the trigger stage K2 is thus reversed and the request criterion on the request line *a*000 is disconnected. If one of the connection circuits of the group SA000 to SA007 contains further requests, these are now evaluated in accordance with their values in the priority logic of the identification device E00 and converted in the coder CE into an item of 3-bit information in the same manner. In this case the signal AGSA remains in existence so that no further requests are transferred until the final handling of the requests which have been received in the connection circuits on the arrival of the first interrogation pulse train T1.

The output of the register stage KE forms the request criterion for the following identification stage. It is emitted via the request line *a*00, while a resetting input of the register stage KE is connected to the resetting line *b*00, via which a resetting criterion arrives from the following stage. The outputs of the intermediate-storage register RE are connected to the identification lines referenced *ce*00 in FIG. 4. All the connection circuits and all the identification devices are constructed in this way.

Figure 6:
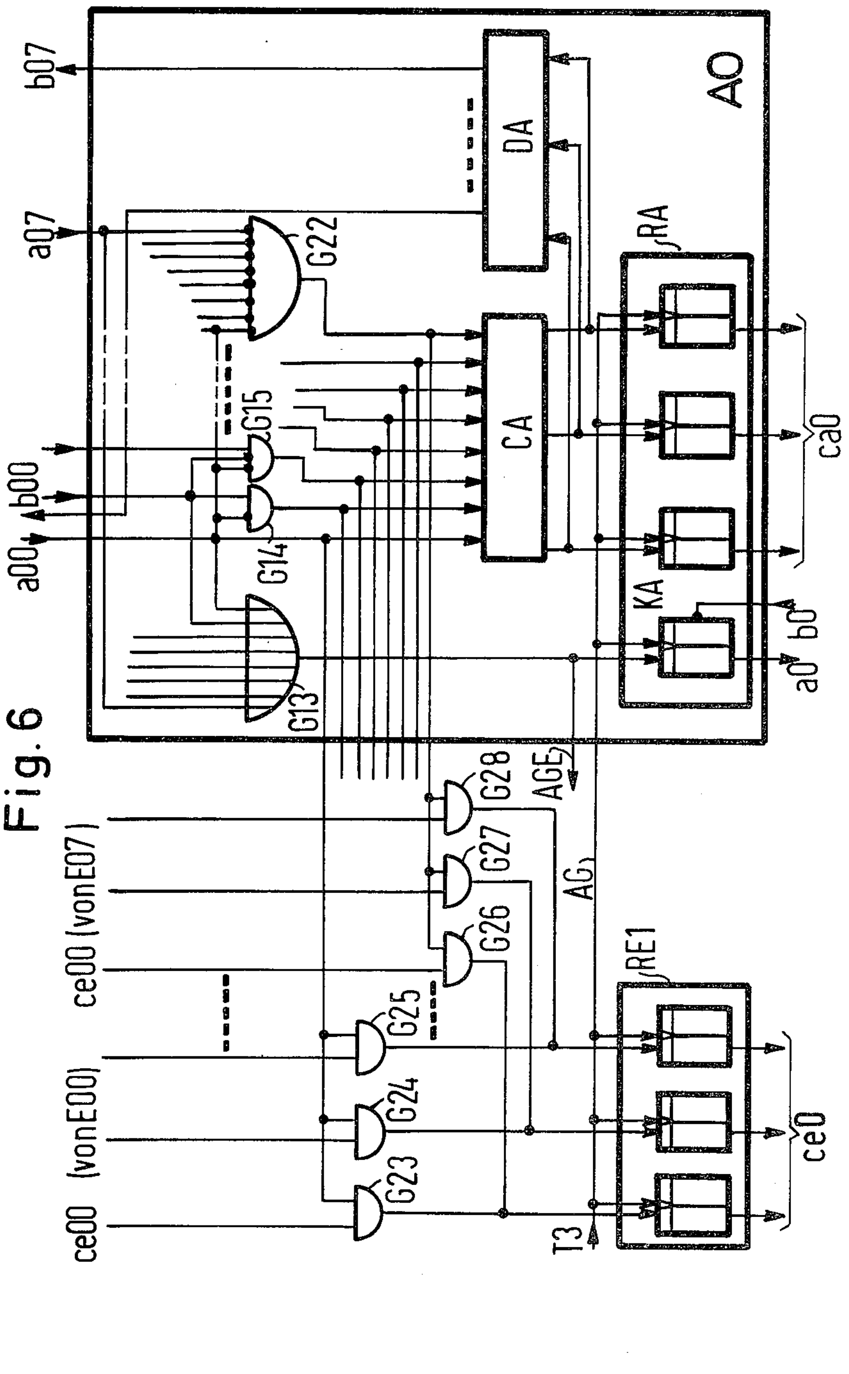
FIG. 6 shows the construction of a control circuit for the connection of the additional stores which are used in an arrangement as shown in FIG. 4.

The stores which serve to receive an identification result which has been intermediately stored in the particular preceding stage can also be 3-bit registers. As an example of the construction of and the mode of connection to the identification device of a stage, FIG. 6 shows the identification device A0 which is constructed as described in FIG. 5. In this example the store RE1 serves to receive the items of information intermediately stored in the registers RE of the preceding identification devices E00 to E07. The trigger stages of the store RE1 are connected via the gates G23 to the identification lines *ce*00 to *ce*07 which lead out from the registers RE of the preceding second stage. The gates are controlled via the priority logic circuit of the identification device, in this case via the priority logic circuit of the identification device A0. A request criterion which is emitted for example from the identification device E00, and which arrives via the request line *a*00 is always evaluated in the priority logic circuit of the identification device A0 as a highest value request criterion. All the other request criteria are not considered in this case. Thus only the gates G23 to G25 are enabled for the information incoming via the identification line *ce*00. This information is transferred under the control of the transfer pulse train T3.

Figure 7:
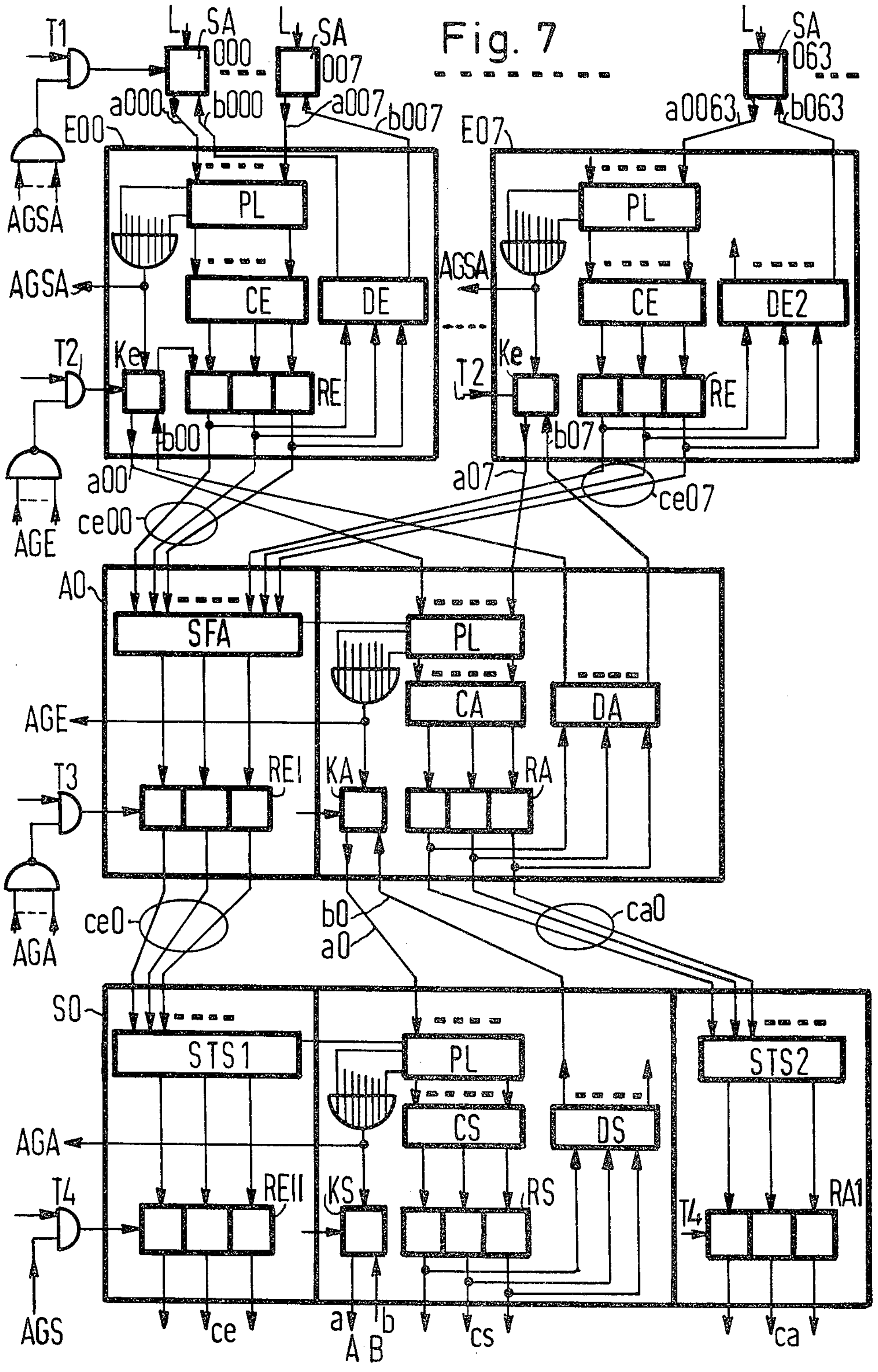
FIG. 7 shows a part of the arrangement shown in FIG. 4 with the aid of which an identification and coding process in stage-by-stage coding will be described in detail.

An identification process will be described in detail in the following, making reference to FIG. 7.

For this purpose it will be assumed that a polarity change has occurred on the lines L which are connected to the connection circuit SA00, SA07 and SA063. It will further be assumed that the identification devices of the entire arrangement are free. In this case the pulse train input gates are enabled for the interrogation pulse train T1 and for the transfer pulse trains T2 to T4. The identification devices E00, E07 in the second stage, the identification device A0 in the third stage and the identification device S0 in the fourth stage participate in the identification of waiting requests. The connection circuits and the identification devices are constructed as described in FIGS. 5 and 6.

On the arrival of the interrogation pulse train T1, a request criterion is emitted, via the request lines *a*000, *a*007 and *a*063. In the priority logic circuit PL2 of the identification devices E00 and E07 this request criterion is evaluated. In the identification device E00 this leads to the number of the first connection unit SA00 being coded in the coder CE. In the same way, the number of the connection unit SA063 is coded in the identification device E07; due to the emission of the signal AGSA, the pulse train gate blocks the interrogation pulse train T1.

On the arrival of the transfer pulse train T2, the coded identification results are transferred into the registers RE; at the same time the register position KE is set in each case. Via the decoder DE in the two identification devices E00 and E07, the number of the connection circuit transmitting the request criterion is in each case formed and, via the resetting line *b*000 and *b*063 in the relevant connection circuits the request criterion is disconnected. On the setting of the register position KE the request criterion is passed on via the request line *a*00 and *a*07. The identification result intermediately stored in the registers RE is likewise passed on via the identification lines *ce*00 and *ce*07 to the next stage.

In the identification device A0 of the next stage, the request criteria are evaluated in the priority logic circuit PL2 in such a manner that only the request criterion which arrives via the line *a*00 is coded in the coder CA. An appropriate control criterion is fed to the control circuit STA. At the same time the signal AGE is produced which blocks the pulse train input of the transfer pulse train T2. On the arrival of the following transfer pulse train T3, the information which has been selected via the control circuit STA is passed into the store RE1. At the same time the coding result is transferred into the register RA and the register position KA is set. Via the decoder DA the selected identification device of the preceding stage is reset via the resetting line b00. The information in the store RE1 and the identification result in the register RA are passed on via the identification lines $ce0$ and $ca0$ to the next stage. With the setting of the register position KA, the request criterion is at the same time passed on via the request line $a0$ to the identification device S0 of the next stage.

In the identification device S0 the request criterion arriving via the request line $a0$ is evaluated in the priority logic circuit PL2, is coded in the coder CS and at the same time the signal AGA is formed with which the pulse train input for the transfer pulse train T3 is blocked. The control circuits STS1 and STS2 are likewise controlled via the priority logic circuit. On the arrival of the transfer pulse train T4, the information emitted from the store RE1 via the identification lines $ce0$ is transferred into the store RE11. The items of information offered from the register RA via the lines $ca0$ are transferred into the store RA1. The information formed in the coder CS is transferred into the register RS, and at the same time the register position KS is also set. Via the decoder DS and via the resetting line $b0$ the request in the preceding stage is reset. The information ce concerning the units position, the information ca concerning the tens position and the information *cs* concerning the hundreds position of the number of the selected connection circuit SA00 is now available at the output of the fourth stage. This information is handled in a manner not represented here by a central control unit. The latter can for example be activated by the criterion A emitted by the register position KS. On completion the register position KS is reset via the line b by a centrally formed signal B.

The following interrogation pulse train T1 and the following first transfer pulse train T2 have no effects in the connection circuits SA000, SA007 and SA063 and in the identification devices E00 and E07 of the second stage, as the relevant pulse train gates are blocked via the signals AGSA and AGE. Only the pulse train gate for the transfer pulse train T3 is enabled, as the identification device S0 has become free again following the transfer of the items of information contained in the stores RE11 and RA1 and in the register RS. As the request criterion present from the request line $a007$ has not yet been processed in the identification device E00 of the second stage, said stage is set immediately following the resetting of the register position KE. Also the coding result of this further request has been transferred into the register RE. Thus in the identification device A0 the request from the identification device E00 in the second stage is again available via the line $a00$. On the arrival of the transfer pulse train T3 in the identification device A0 the described processes are re-initiated i.e., both the contents of the register RE are transferred into the register RE1 and also the coding result is transferred into the register RA and at the same time the register position KA is set again.

With the transfer pulse train T4 these items of information are transferred into the identification device SO and processed in the described manner. Now the information concerning the units, tens and hundreds position of the connection circuit SA007 is available at the outputs *ce*, *ca* and *cs*. When these items of information have been processed, a new cycle commences. The pulse train gates for the pulse trains T1 and T2 remain blocked. In the identification device A0 however, the request criterion is still available via the request line $a07$. In the described manner this request criterion is evaluated, the appropriate information is coded in the coder CA and provided to the register. At the same time the information from the register RE is provided via the identification lines $ce07$ and via the control circuit STA to the store RE1. These items of information are transferred by the transfer pulse train T2, the register position KA is set again; the identification device E07 is reset into the original state via the decoder DA and via the resetting line b07. Via the identification lines $ce0$ and $ca0$ the contents of the store RE1 and the register RA are emitted. Via the request line $a0$ a new request criterion is transmitted to the identification device S0 where it is evaluated in the priority logic PL2 and coded in the coder CS. On the arrival of the transfer pulse train T4, the items of information from the store RE1 are transferred into the store RE11, the items of information from the register RA are transferred into the store RA1 and the items of information formed by the coder CS are transferred into the register RS. Via the decoder DS and the resetting line $b0$, the identification device of the preceding stage AO is reset into the original state. The information *ce*, *ca* and *cs* concerning the units, tens and hundreds position of the connection circuit SA063 is now available at the output of the identification device S0. As now the signals AGSA, AGE and AGA are disconnected, the pulse train gates for the pulse trains T1, T2 and T3 are enabled. On the arrival of the interrogation pulse train T1, the next group of interrogation process is started. All the polarity changes which have occurred in the meantime on the lines L are transferred into the connection circuits and lead to the formation of new request criteria.

Figure 8:
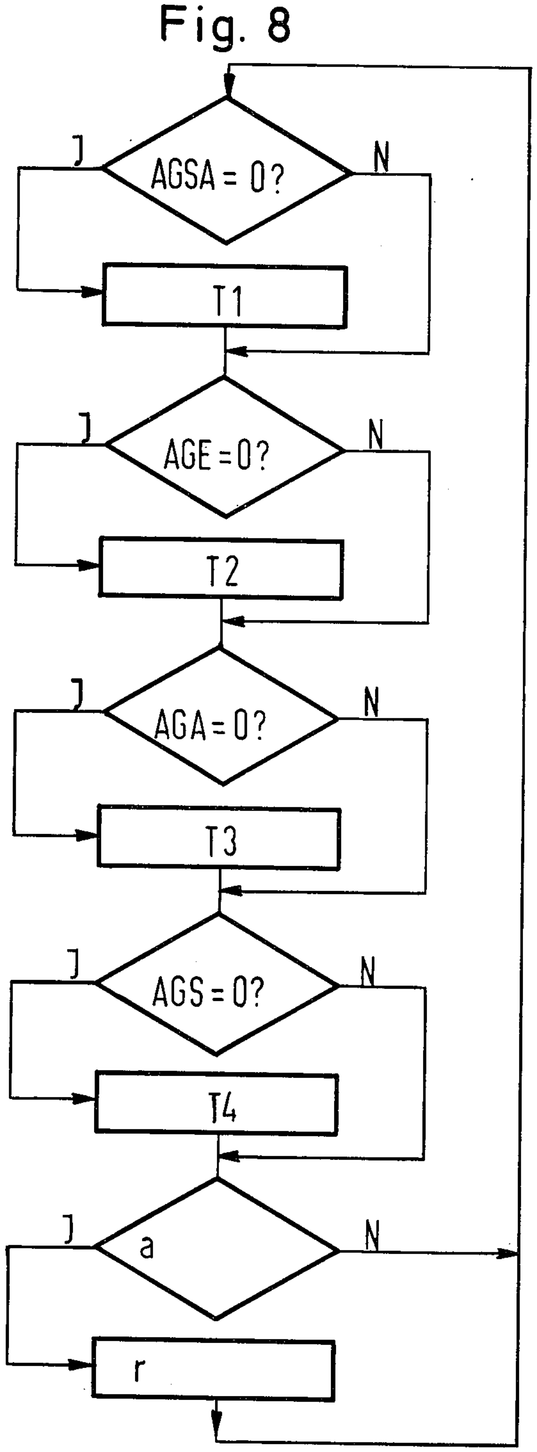
FIG. 8 shows, in the form of a flow diagram, the pulse train sequence for an identification and coding process in stage-by-stage coding.

The pulse train control, shown in FIG. 8 in the form of a simplified flow diagram, of the identification and coding processes permits, when identification and coding arrangement are provided in duplicate, a comparison of results at all pulse train times. Thus such an arrangement enables synchronous parallel operation which has the advantage that it is possible to establish faults even before further processing. Then no special fault detection devices or special diagnosis programmes are required.

With the arrangement shown in FIGS. 4 to 8 it is ensured that the requests contained in a stage in the identification arrangement are always requests which have been waiting longer than or equally as long as those in the preceding stages. In this way it is possible to achieve a more accurate division of the requests in accordance with their waiting time, which means better adaption to the "first in - first out" principle. The distortions which were mentioned in the introduction and which are caused by waiting times are thus reduced to a minimum.

We claim

1. Arrangement for the prompt identification of lines connected to connection circuits of a programme-controlled data switching system and for coding the identification result, wherein each connection circuit is assigned a specific number, characterized in that the connection circuits include storage devices and gate switching elements, the items of information occurring on the lines being transferred into the storage devices in groups in response to a central interrogation pulse train, the gate switching elements being responsive to the occurence of one of said items to emit a request criterion, a series of decentralized identification devices arranged in stages in accordance with coordinate principles, each stage including means for identifying one digit of the code characterizing the connection circuit emitting the requests and connected request and resetting lines connecting said identification devices in successive stages, and coding switching elements for coding the identification result of each stage and registers coupled to said coders for storing the results of said coding, said registers holding the resultant identification of said request.

2. Arrangement as claimed in claim 1, characterized in that said coding switching elements and said registers for the intermediate storage of the identification result for all the connection circuits comprises a common coder and a common register for each of said stages, that the coder of the first stage is connected via identification lines to all the connection circuits, and the coders of the following stages, are connected via identification lines to the identification devices of the relevant stage with which the coder and register are associated.

3. Arrangement as claimed in claim 2, characterized in that each identification device further comprises a priority logic circuit including means for switching through to the identification device of the next succeeding stage only the highest value arriving request criterion, the transmission of a resetting criterion emitted from an identification device of the following stage to the preceding stage being contemporaneously interrupted, each identification device including a gate circuit prepared by the request criterion and responsive to the disconnection of the resetting criterion to connect the identification device of the relevant stage to the identification line for the emission of the identification result.

4. Arrangement as claimed in claim 2, characterized in that the registers which intermediately store the identification result of the individual stages are responsive to a transfer pulse train to transfer out the stored information, and that the transfer pulse train is initiated following an identification and coding process, through the evaluation of a message criterion occurring on the request line of the identification device comprising the last stage.

5. Arrangement as claimed in claim 1, characterized in that each identification device comprises a coder and a register connected to the output of said coder for coding and the intermediate storage of the identification result by a transfer pulse train, means controlled by passing the request criterion via the request line to the following stage, and the intermediately stored identification result from the register via the identification lines to an additional storage device in the following stage, and transmitting the resetting criterion via the resetting line to the preceding stage.

6. Arrangement as claimed in claim 5, characterized in that each identification device contains a priority logic circuit for the selection of the particular highest value request criterion, said priority logic circuit including an additional position in the intermediately storing register and means for producing during each selection process a signal and blocks for preparing the storing register and for blocking the input of the transfer pulse train to the preceding stage, and including a decoder for decoding the intermediately stored identification result for forming a resetting criterion.

7. Arrangement as claimed in claim 6, including a control circuit assigned to the additional storage devices of each stage the identification device of the relevant stage forming a control criterion in said circuit whereby the identification lines are connected to the input of the additional storage device which are connected to the selected intermediately storing register of the preceding stage.

8. Arrangement as claimed in claim 1, characterized in that the storage device of a connection circuit comprises two bistable trigger stages, that the first trigger stage is prepared in accordance with the information occurring on the line connected thereto and is responsive to the interrogation pulse train, whereas the second trigger stage is responsive to the resetting criterion, so that when the second trigger stage is reversed by said resetting criterion, the request criterion of the relevant connection circuit is disconnected.

9. Arrangement as claimed in claim 8, characterized in that for the reversal of the second trigger stage, in the connection circuit, including gate means having inputs connected to the request line, the resetting line and the transfer train and an output connected to the pulse train input of the second trigger stage for reversing said second trigger stage and disconnecting said request criterion.

10. Arrangement as claimed in claim 8, characterized in that for the reversal of the second trigger stage the pulse train input of said second trigger is directly connected to the resetting line.

* * * * *